United States Patent [19]

Shoemaker

[11] 3,896,680
[45] July 29, 1975

[54] TWIST-GRIP CONTROL FOR MOTORCYCLE CLUTCH
[76] Inventor: Billy D. Shoemaker, Box 5, Southern Ill. University, Edwardsville, Ill. 62025
[22] Filed: July 8, 1974
[21] Appl. No.: 486,688

[52] U.S. Cl. .................... 74/489; 74/96; 192/89 B
[51] Int. Cl.² .................. F16D 41/24; G05G 11/00
[58] Field of Search .............. 192/89 B, 93 R, 99 S; 74/489, 96, 99 A, 551.8

[56] References Cited
UNITED STATES PATENTS
1,281,043  10/1918  Magner ................................ 74/489

FOREIGN PATENTS OR APPLICATIONS
363,267  7/1906  France ................................ 74/489

Primary Examiner—Benjamin W. Wyche

[57] ABSTRACT

This device is designed to replace the standard clutch lever. It includes primarily a handle grip with a cam, the device being held to the handle bar of the motorcycle by a cable holding clamp device and roller and lever means in conjunction with the cam surface, serves to actuate the motorcycle clutch.

4 Claims, 3 Drawing Figures

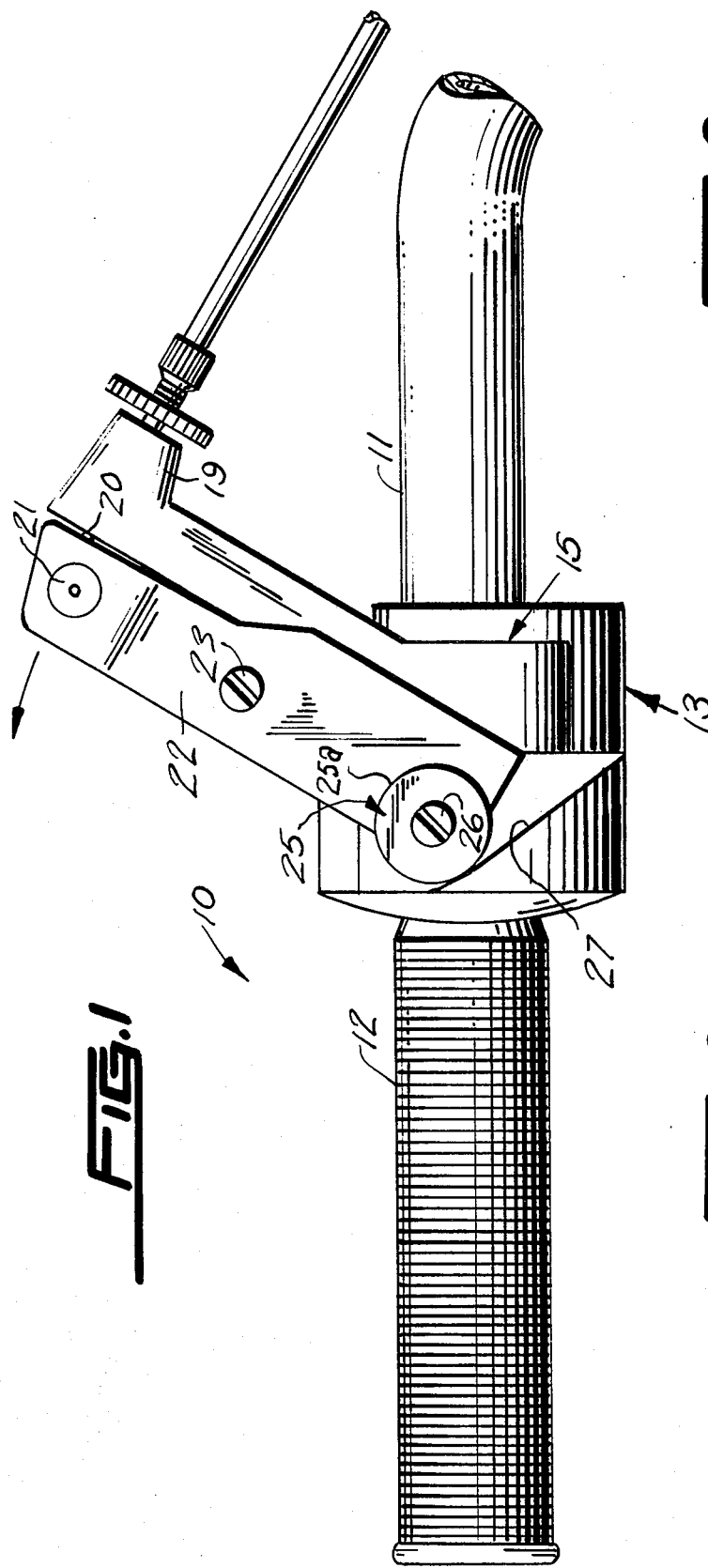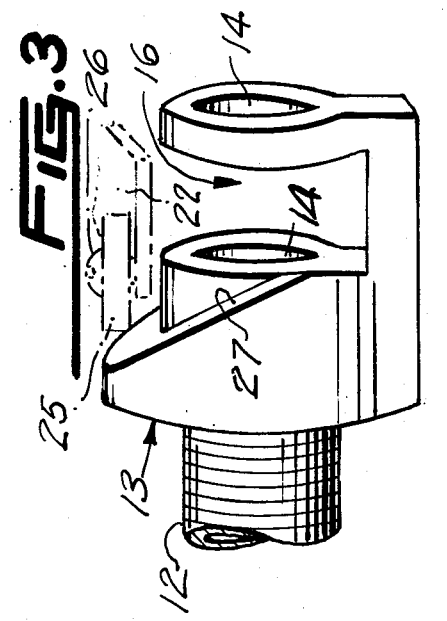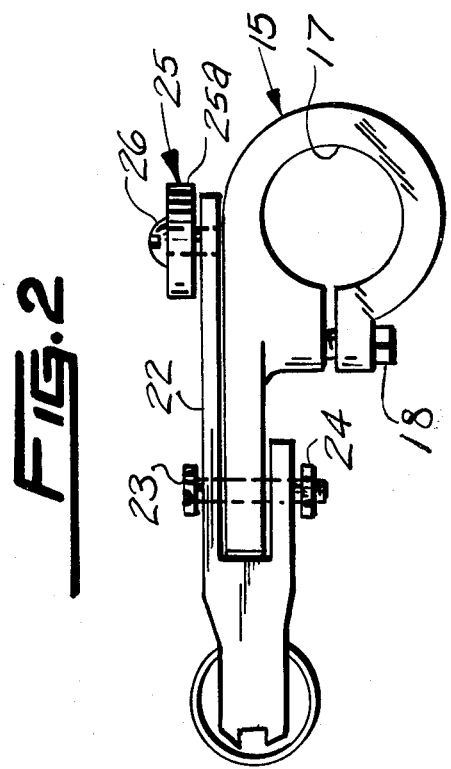

TWIST-GRIP CONTROL FOR MOTORCYCLE CLUTCH

This invention relates to clutches, and more particularly to a twist-grip clutch for motorcycles.

It is therefore the principal object of this invention to provide a twist-grip clutch which will be used on motorcycles and motor bikes as a superior replacement for the lever operated device of the prior art.

Another object of this invention is to provide a twist-grip clutch device which will be of such construction, so as to be easier to operate than the lever type and the device will eliminate the muscles of a person's hand from cramping as is encountered with the lever type device, particularly in city riding or riding in competition.

The twist-grip clutch is operated with the whole hand and wrist which are much stronger than the grasping fingers on a lever and with this device the driver's hand never releases its grip upon the bar, therefore it provides for safer operation.

Another object of this invention is to provide a device of the type described, which will be easier to learn to operate than a lever, and it will provide easy means for women operators to operate the clutch and the device by being a rotary type, is much smoother in operation than the lever which tends to have a jerky motion.

The twist clutch is used in conjunction, with the twist throttle and it is a natural action, as when stopping the vehicle, the throttle is turned upwards or to the right to close, likewise, the clutch is turned outwards or to the left to disengage. When starting the vehicle in motion again, both are turned or rotated inwards, which is much more natural and safer than when using the lever device.

After using this device for a short length of time, the operator will find that when it is disengaged or rotated left, all that is needed to engage is a slight release of the operator's grip and the hand grip revolves in the operator's hand and thus provides a very smooth start for the vehicle.

A further object of this invention is to provide a twist grip clutch of the type described, which will have an inherent mechanical advantage provided for by the lever action, but it is actuated in an easy manner.

A still further object of this invention is to provide a twist grip clutch of the type described, which will include a handle grip having a cam attached fixedly thereto, the cam being secured to the handle bar by a cable holding bar clamp which pivotably carries the actuating lever having the roller which engages the cam surface the outer portion of the lever having secured thereto, the clutch cable.

Other objects of the invention are to provide a twist-grip clutch for motorcycles which is simple in design, inexpensive to manufacture, rugged in construction, easy to use and efficient in operation.

These and other objects will be readily evident upon a study of the following specification and the accompanying drawing, wherein:

FIG. 1 is a plan view of the present invention shown installed upon a handle bar;

FIG. 2 is a side view of the clamp and lever shown in elevation and removed from the assembly;

FIG. 3 is a fragmentary perspective view of the handle grip and cam portion of the device with the cam roller shown in phantom lines.

According to this invention, a twist grip clutch 10 is mounted to the one end of handle bar 11 and it includes a handle grip 12 which is fixedly secured in a suitable manner to cam 13. Handle bar 11 is received within the openings 14 of cam 13 and a cable holding bar clamp 15 is freely carried within the cut out opening 16 of cam 13. The handle bar 11 is received within the openings 17 of cable holding bar clamp 15 and bar clamp 15 is held securely to handle bar 11 by means of a clamp bolt fastener 18 the end 19 of bar clamp 15 freely carries the clutch cable 20 which is secured fixedly in a suitable manner to portion 21 of actuating lever 22. Lever 22 is pivotably carried upon bar clamp 15 by means of a bolt fastener 23 which receives nut fastener 24. A roller 25 is rotatably carried upon actuating lever 22 by means of bolt fastener 26 and the outer peripheral surface 25a of roller 25, engages the cam surface 27.

When the handle grip 12 is rotated counterclockwise the roller 25 is urged forwards by means of the cam surface 27. The afore mentioned action, causes actuating lever 22 to pivot away from the end 19 of bar clamp 15 which moves cable 20. The cam 13 when fully rotated counter clockwise, will move the roller one full inch forwards, this being accomplished by one half turn of the handle grip 12, and in disposition, the clutch is disengaged in order to engage the clutch the handle grip 12 is rotated clockwise.

It shall be noted that a small braking mechanism may be added to the arrangement and it will be adjustable tension-wise so as to enable the clutch to engage automatically, in use when the clutch is disengaged, when starting off, the grip 12 is released completely, and the brake governs the response as it automatically engages from the tension of the clutch springs.

It shall further be noted that cam 13 portion of handle grip 12 spans around the main portion of cable holding bar clamp 15, thus forming another ring means around the handle bar 11 so as to create a very stable arrangement for carrying the thrust load.

While various changes may be made in the detail construction, it is understood that such changes will be within the spirit and scope of the present invention as is defined by the appended claims.

What I now claim is:

1. A twist-grip clutch for motorcycles, comprising a handle grip cam combination, a cable holding bar clamp retained within said cam, bolt fastener means secured within said clamp, a pivotable actuated lever secured to said clamp with fastener means and a pivotable roller secured to said actuating lever, the structure moving cable means of the vehicle's clutch.

2. The combination according to claim 1, wherein said handle grip and cam combination are freely received upon one end of the vehicle's handle bar and said cable holding bar clamp is freely carried with opening means of said cam and said bar clamp is secured fixedly to said handle bar by said bolt fastener which closes the opening of said clamp tightly against the outer periphery of said handle bar and cable of said clutch is freely carried within the outer end of said clamp.

3. The combination according to claim 2, wherein the actuating lever is pivotably secured to said cable holding bar clamp by bolt fastener means, the outer end portion of one end of said actuating lever being secured fixedly to said cable of said clutch and the opposite end of said actuating lever is provided with said roller which is secured by bolt fastener means to said lever, said roller being in rolling engagement with the cam surface of said cam of said device.

4. The combination according to claim 3, wherein said handle grip and said cam when rotated counter clockwise, will urge said roller forwardly above said handle bar and said lever moves said clutch cable and once said grip is rotated clockwise said lever is rotated in the opposite direction.

* * * * *